Feb. 4, 1958  E. L. CANFIELD  2,822,196
PRESSURE RESPONSIVE DISTORTABLE O-RING TYPE WATERPROOF SEAL
Filed April 25, 1955  2 Sheets-Sheet 1

INVENTOR
EARL L. CANFIELD
BY
ATTORNEYS

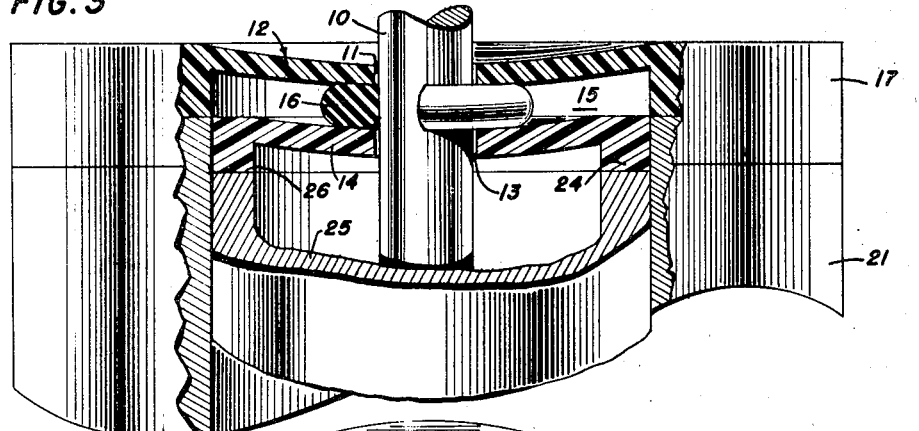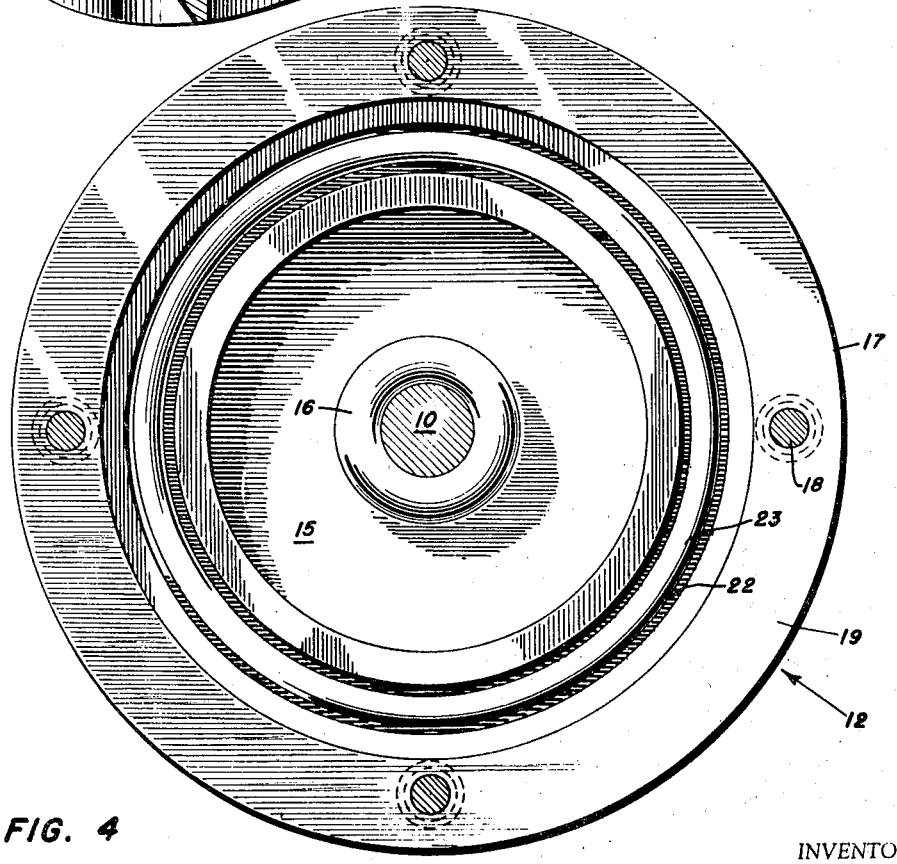

United States Patent Office 2,822,196
Patented Feb. 4, 1958

2,822,196
PRESSURE RESPONSIVE DISTORTABLE O-RING TYPE WATERPROOF SEAL

Earl L. Canfield, Essex, Conn., assignor, by mesne assignments, to the United States of America as represented by the Secretary of the Navy Application April 25, 1955, Serial No. 503,839

4 Claims. (Cl. 286—7)

This invention relates to hydrostatic seals and more particularly to a means for sealing shafts of underwater devices against the entry of water due to increasing hydrostatic pressure as the device descends in depth.

Heretofore rotating or reciprocating shafts of underwater devices have been provided with packing glands or seals which, in order effectively to seal against water entry, subjected the shafts to tight frictional engagement and thereby imposed a substantial frictional braking load upon the rotating shaft usually far in excess of that necessary in order to obtain a proper seal.

It is an object of the present invention to avoid such unnecessary frictional load and to provide a seal which applies a minimum amount of friction to a submerged shaft.

A further object of the present invention is to provide a low friction seal which operates with minimum frictional contact at low levels of submergence and which proportionally increases the sealing engagement as required.

A further object is to provide a shaft sealing construction having automatic means to increase the sealing pressure at one rate as the hydrostatic pressure increases until a certain point is reached after which the sealing pressure increases at a lesser rate.

A further object is to provide a seal of simple construction which is self-aligning in use, may readily be mass produced of polyvinyl materials and which is resistant to salt water corrosive effects.

Other objects and many of the attendant advantages of this invention will be readily appreciated as the same becomes better understood by reference to the following detailed description when considered in connection with the accompanying drawings wherein:

Fig. 3 is a change position view of the device of Fig. 1 showing the relative positions of the parts after the application of excessive hydrostatic pressure thereto; and Fig. 4 is a transverse sectional view taken along a line substantially corresponding to line 4—4 of Fig. 1.

The hydrostatic seal of the present invention employs an outer flexible diaphragm having a shaft admitting opening therein, an inner flexible diaphragm having a similar opening and an annulus of deformable material such as a rubber O ring located between said diaphragms and surrounding a shaft extending through said openings.

Figure 1:
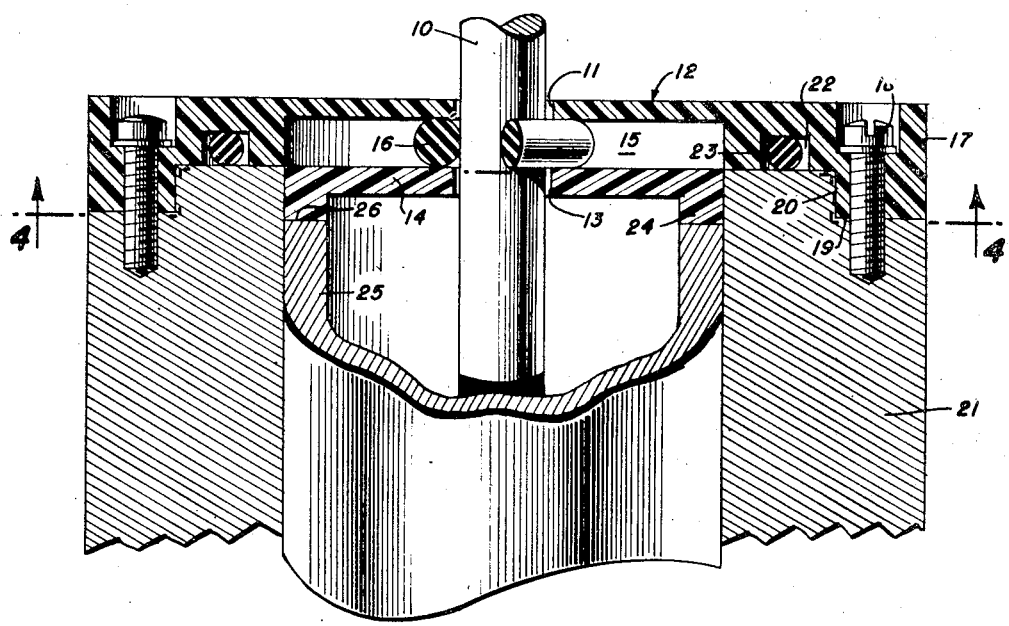
Fig. 1 is a vertical sectional view of one embodiment of the present invention.

In the embodiment illustrated in Fig. 1 the shaft 10 to be sealed is shown extending through an opening 11 in an outer diaphragm cap 12 and through an opening 13 in an inner diaphragm 14 which diaphragms are spaced from each other to provide a space 15 to accommodate a conventional elastic O ring 16 which is slightly undersize with respect to the shaft so that when installed it stretches a little to establish a low sealing pressure against the shaft. Both diaphragms 12 and 14 are preferably of nylon or of a suitable moldable thermosetting polystyrene or a similarly flexible substance and the O ring 16 may be of rubber or the like.

The outer diaphragm 12 has a thick peripheral flange 17 apertured at intervals to receive anchoring cap screws 18 and having a shoulder 19 to engage a mating shoulder 20 on the body 21 of the device. The undersurface of the outer diaphragm cap 12 has a circular groove 22 to receive a sealing ring 23 so that the outer diaphragm is sealed to the end of body 21 as illustrated.

In the embodiment shown the inner flexible diaphragm 14 likewise has a thickened peripheral flange 24 which abuts the end of a body liner 25. It will be apparent that the liner 25 and the body 21 may be integral or otherwise suitably arranged as long as an adequate shelf or other holding means 26 is provided to support the margin 24.

Between the two flexible diaphragms 12 and 14 above-described is located an O ring 16 which as afore-mentioned is slightly stretched by the passage of the shaft 10 therethrough so that it engages the shaft snugly with a low pressure sufficient to perform the necessary sealing function when no substantial hydrostatic pressure is present. It will be noted that the outer margin of the outer diaphragm is sealed by the series of anchoring screws 18 and the sealing ring 23. When the device is submerged or otherwise subjected to substantial pressure such as is indicated by the arrows in Fig. 2, the outer diaphragm 12, being flexible moves to compress the O ring 16 thereby tending to deform the O ring both radially outward into the space 15 and radially inward against the shaft 10. This action not only increases the pressure of the O ring against the shaft but, by the deformation of the shaft engaging portion thereof as indicated in Fig. 2, also increases the contact area of the O ring with the shaft.

Figure 2:
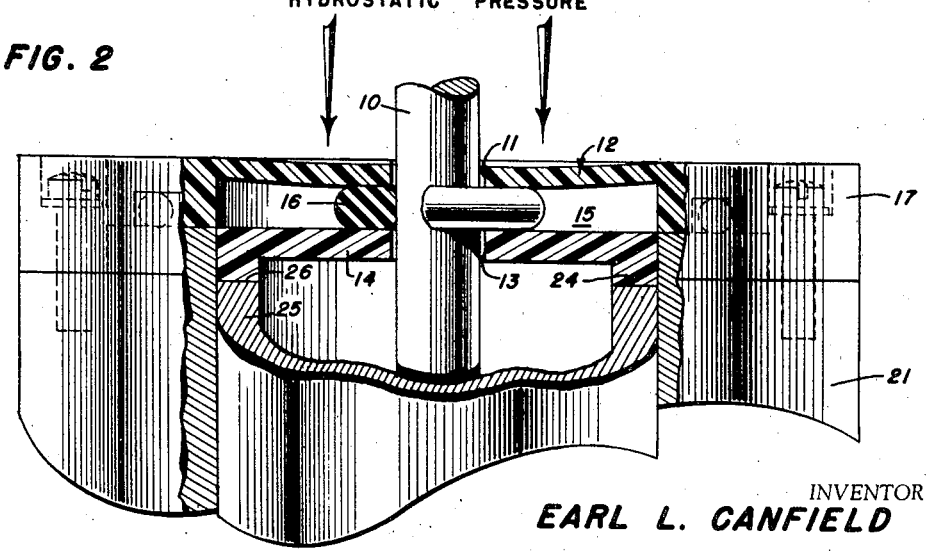
Fig. 2 is a change position view of the device of Fig. 1 showing the effect of the application of normal hydrostatic pressure thereto.

In Fig. 3 is shown a still further change position of the device of the present invention wherein the parts are subjected to a hydrostatic pressure in excess to that of Fig. 2 so that the inner flexible diaphragm 14 is also deflected by the increased hydrostatic pressure transmitted through the seal 16. Yielding movement of this inner diaphragm reduces the rate at which the O ring 16 is deformed by pressure rise and hence reduces the rate at which the sealing frictional engagement of the O ring against shaft 10 is increased. It will be apparent that by proper selection of the thickness and strength of material of the inner flexible diaphragm 14 it may be caused to function only after substantial hydrostatic pressure has been applied to the O ring and hence this inner diaphragm serves to cushion or lessen the rate at which the O ring is deformed. With such an arrangement not only is the shaft sealed with a minimum amount of friction when no hydrostatic pressure exists and not only is a gradually increasing amount of O ring pressure provided as necessary to maintain sealing engagement while the hydrostatic pressure increases to the certain limit but also, by the flexible character of the inner diaphragm 14, excessive pressures are prevented from so rapidly increasing frictional engagement of the O ring with the shaft that the shaft is completely stopped from operation. Of course, by such an arrangement the margin of sealing pressure over the minimum necessary to maintain the hydrostatic seal is gradually reduced so that at abnormal pressures the seal may ultimately leak, yet by such an arrangement a controlled minimum frictional interference with rotation of the shaft is applied throughout the range of desired operation of the device.

Of course, when the hydrostatic pressures are relieved the seal promptly removes frictional contact with the shaft as rapidly as is possible without leakage.

The above-described construction is particularly useful in the construction of torpedoes and other elements of ordnance equipment wherein a shaft must be packed or sealed without imposing any more frictional interference to shaft movement than is necessary to maintain a seal. An example of such use is the packing for synchro transmitters where a minimum interference with shaft rotation is required.

Obviously many modifications and variations of the present invention are possible in the light of the above teachings. It is therefore to be understood that within the scope of the appended claims the invention may be practiced otherwise than as specifically described.

What is claimed is:

1. A seal comprising an inner wall of flexible material, an outer wall of flexible material spaced from the inner wall, a deformable O ring placed between said walls and surrounding a shaft extending through openings in said walls, the inner wall being of more rigid material than the outer wall, whereby it will offer substantial resistance to axial movement under normal pressures thus allowing for sufficient deformation of the O ring to assure proper sealing, but will yield under additional greater pressure to permit necessary sealing without unduly increasing frictional engagement of the O ring with the shaft.

2. A variable friction pressure seal for separating an outer high pressure area from an inner low pressure area and allowing the passage of a shaft comprising an outer flexible diaphragm rigidly supported at its outer periphery and having an opening to receive the shaft, an inner flexible diaphragm rigidly supported at its outer periphery and having an opening substantially in registry with the opening of the outer diaphragm to also receive said shaft and a deformable annulus soft in comparison with said diaphragms and located between said diaphragms and surrounding said shaft and in frictional engagement therewith so that as the pressure exerted on the outer diaphragm is increased said annulus is deformed against the shaft in tighter sealing engagement therewith, said diaphragms and annulus being displaceable axially inwardly along the shaft when subjected to a predetermined outer pressure to eliminate excessive frictional engagement between the annulus and the shaft.

3. A variable friction pressure seal for a rotating shaft disposed within a tubular member comprising, a flexible hollow disc-like diaphragm the hollow interior thereof forming spaced inner and outer walls, said diaphragm being disposed within said tubular member and apertured to receive the shaft therethrough, and a deformable annulus located within said diaphragm in contiguous relationship with said inner and outer walls and in surrounding frictional engagement with said shaft, whereby upon increase in pressure on the outer wall said outer wall will flex against said annulus and deform the annulus into accordingly tighter engagement with the shaft, the entire diaphragm being flexible inwardly to allow axial displacement of the annulus to eliminate excessive and undesirable additional frictional engagement between said annulus and said shaft.

4. A variable friction pressure seal for a rotating shaft disposed within a tubular member comprising, a flexible hollow disc-like diaphragm, the hollow interior thereof forming spaced inner and outer walls, said inner wall being less flexible than said outer wall, said diaphragm being disposed within said tubular member and apertured to receive the shaft therethrough, and a deformable annulus located within said diaphragm in contiguous relationship with said inner and outer walls and in surrounding engagement with said shaft, whereby upon increase in hydrostatic pressure on the outer wall said diaphragm will act to urge the annulus in tighter engagement with the shaft, said diaphragm simultaneously flexing inwardly to allow axial displacement of the annulus to eliminate excessive and undesirable additional frictional engagement between said annulus and said shaft.

References Cited in the file of this patent

UNITED STATES PATENTS

| | | |
|---|---|---|
| 214,841 | Prindle | Apr. 29, 1879 |
| 324,486 | Reilly | Aug. 18, 1885 |
| 2,437,814 | Hallen | Mar. 16, 1948 |
| 2,535,288 | Honkanen | Dec. 26, 1950 |